US012732825B2

(12) United States Patent
Sarkis et al.

(10) Patent No.: US 12,732,825 B2
(45) Date of Patent: Sep. 8, 2026

(54) METHODS AND APPARATUSES FOR TRANSFERRING OF SHARED RADIO FREQUENCY BAND ACCESS INDICATIONS

(71) Applicant: QUALCOMM Incorporated, San Diego, CA (US)

(72) Inventors: Gabi Sarkis, San Diego, CA (US); Guangyi Liu, Shanghai (CN); Stelios Stefanatos, San Diego, CA (US); Parisa Cheraghi, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 18/254,361

(22) PCT Filed: Jan. 12, 2022

(86) PCT No.: PCT/US2022/012179
§ 371 (c)(1),
(2) Date: May 24, 2023

(87) PCT Pub. No.: WO2022/164635
PCT Pub. Date: Aug. 4, 2022

(65) Prior Publication Data

US 2024/0107327 A1 Mar. 28, 2024

(30) Foreign Application Priority Data

Jan. 26, 2021 (GR) .............................. 20210100046

(51) Int. Cl.
*H04W 16/14* (2009.01)
*H04W 72/0453* (2023.01)
(Continued)

(52) U.S. Cl.
CPC ....... *H04W 16/14* (2013.01); *H04W 72/0453* (2013.01); *H04W 72/25* (2023.01); *H04W 88/08* (2013.01)

(58) Field of Classification Search
CPC .. H04W 16/14; H04W 72/25; H04W 72/0453
(Continued)

(56) References Cited

U.S. PATENT DOCUMENTS 10,455,429 B2 * 10/2019 Wang .................... H04W 16/14
11,019,625 B2 5/2021 Wu et al.
(Continued)

FOREIGN PATENT DOCUMENTS

WO WO-2019067456 A1 4/2019
WO WO-2020131303 A1 6/2020

OTHER PUBLICATIONS

International Search Report and Written Opinion—PCT/US2022/012179—ISA/EPO—May 2, 2022.

*Primary Examiner* — Intekhaab A Siddiquee
(74) *Attorney, Agent, or Firm* — QUALCOMM Incorporated

(57) ABSTRACT

Methods, systems, and devices for wireless communications are described for shared radio frequency spectrum band access information. A sensing device may monitor one or more frequencies of the shared radio frequency spectrum band and may receive signaling indicating access information (e.g., automated frequency control information). The access information may indicate one or more frequencies of the shared radio frequency spectrum band that are accessible for the sensing device. The scheduling device may obtain the access information from an access point, local storage media, or the like. In some examples, the scheduling device may transmit signaling indicating the accessible frequencies based on a request message from the sensing device. The sensing device may receive the access information and may
(Continued)

communicate on one or more of the indicated frequencies accordingly.

26 Claims, 11 Drawing Sheets

(51) Int. Cl.
*H04W 72/25* (2023.01)
*H04W 88/08* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2016/0242180 | A1* | 8/2016 | Richards | H04W 72/0453 |
| 2019/0280763 | A1* | 9/2019 | Smyth | H04B 7/18513 |
| 2019/0349991 | A1* | 11/2019 | Mukherjee | H04L 5/1469 |
| 2020/0137603 | A1 | 4/2020 | Xue et al. | |
| 2020/0266951 | A1 | 8/2020 | Sun et al. | |
| 2022/0224496 | A1* | 7/2022 | Kalenahalli | H04W 72/0453 |

* cited by examiner

200

400

600

1000

METHODS AND APPARATUSES FOR TRANSFERRING OF SHARED RADIO FREQUENCY BAND ACCESS INDICATIONS

CROSS REFERENCE

The present application is a 371 national stage filing of International PCT Application No. PCT/US2022/012179 by SARKIS et al. entitled "METHODS AND APPARATUSES FOR TRANSFERRING OF SHARED RADIO FREQUENCY BAND ACCESS INDICATIONS," filed Jan. 12, 2022; and claims priority to Greece Patent Application No. 20210100046 by SARKIS et al., entitled "SHARED RADIO FREQUENCY BAND ACCESS INDICATIONS," filed Jan. 26, 2021, each of which is assigned to the assignee hereof, and each of which is expressly incorporated by reference in its entirety herein.

FIELD OF TECHNOLOGY

The following relates to wireless communications, including shared radio frequency band access indications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples of a wireless multiple-access communications system, one or more devices may communicate via shared (e.g., unlicensed) frequency bands, where one or more of the shared frequencies may be reserved for certain devices. For example, some frequency bands (e.g., U-NII-5, U-NII-7, etc.) may already be occupied by other devices.

SUMMARY

The described techniques relate to improved methods, systems, devices, and apparatuses that support shared radio frequency band access indications. Generally, the described techniques provide for a wireless device monitoring a set of frequencies of a shared radio frequency band, receiving an indication of access information (e.g., automatic frequency control (AFC) information), and communicating on one or more accessible frequencies of the shared radio frequency band based on the access information indication.

A wireless device, such as a sensing device (e.g., a UE, a vehicle UE (vUE), a sensor, a camera, etc.) may use shared (e.g., unlicensed) frequency bands. The sensing device may monitor the shared radio frequency band. A scheduling device (e.g., a sidelink relay, a sidelink UE, a gNB, etc.) may transmit, to the sensing device, an access information indication corresponding to one or more frequencies of the shared radio frequency band. The access information indication may indicate, to the sensing device, one or more frequencies that the sensing device is allowed to access. For example, in some cases, one or more frequencies (e.g., subbands) of the shared frequency bands may be reserved for particular devices (e.g., incumbent devices predefined to operate with certain frequencies), and the access information indication may instruct the sensing device to use frequencies other than the one or more reserved frequencies.

In some examples, the scheduling device may transmit the access information indication as an implicit indication (e.g., where the presence of a transmission in a frequency band may indicate that the frequency band may be accessed) or an explicit indication (e.g., a transmission explicitly indicating accessible frequencies). The scheduling device may transmit the indication periodically, semi-persistently, or on demand. Additionally, or alternatively, the scheduling device may transmit the access information indication as a sidelink transmission, via a first radio interface different from a second radio interface, as part of a synchronization signal block (SSB), or as part of a system information block (SIB). The sensing device may receive the access information indication from the scheduling device and communicate on one or more of the indicated accessible frequencies of the shared radio frequency band.

A method for wireless communication at a first wireless device is described. The method may include monitoring a set of multiple frequencies of a shared radio frequency spectrum band, receiving, from a second wireless device, signaling that indicates access information that indicates an accessible set of frequencies of the set of multiple frequencies of the shared radio frequency spectrum band that are accessible for communications by the first wireless device, and communicating on one or more of the accessible set of frequencies of the shared radio frequency spectrum band based on the access information.

An apparatus for wireless communication at a first wireless device is described. The apparatus may include a processor, memory coupled with the processor, and instructions stored in the memory. The instructions may be executable by the processor to cause the apparatus to monitor a set of multiple frequencies of a shared radio frequency spectrum band, receive, from a second wireless device, signaling that indicates access information that indicates an accessible set of frequencies of the set of multiple frequencies of the shared radio frequency spectrum band that are accessible for communications by the first wireless device, and communicate on one or more of the accessible set of frequencies of the shared radio frequency spectrum band based on the access information.

Another apparatus for wireless communication at a first wireless device is described. The apparatus may include means for monitoring a set of multiple frequencies of a shared radio frequency spectrum band, means for receiving, from a second wireless device, signaling that indicates access information that indicates an accessible set of frequencies of the set of multiple frequencies of the shared radio frequency spectrum band that are accessible for communications by the first wireless device, and means for communicating on one or more of the accessible set of frequencies of the shared radio frequency spectrum band based on the access information.

A non-transitory computer-readable medium storing code for wireless communication at a first wireless device is described. The code may include instructions executable by a processor to monitor a set of multiple frequencies of a shared radio frequency spectrum band, receive, from a second wireless device, signaling that indicates access information that indicates an accessible set of frequencies of the set of multiple frequencies of the shared radio frequency spectrum band that are accessible for communications by the first wireless device, and communicate on one or more of the accessible set of frequencies of the shared radio frequency spectrum band based on the access information.

Some examples of the method, apparatuses, and non-transitory computer-readable medium described herein may further include operations, features, means, or instructions for monitoring for a presence of the signaling on a first frequency of the set of multiple frequencies, where the presence of the signaling on the first frequency implicitly indicates to the first wireless device that the first frequency may be included in the accessible set of frequencies.

Some examples of the method, apparatuses, and non-transitory computer-readable medium described herein may further include operations, features, means, or instructions for decoding a message based on the received signaling, where the message includes the access information.

Some examples of the method, apparatuses, and non-transitory computer-readable medium described herein may further include operations, features, means, or instructions for transmitting a request message including a request for the access information, where receiving the signaling may be based on the request message.

Some examples of the method, apparatuses, and non-transitory computer-readable medium described herein may further include operations, features, means, or instructions for receiving the signaling using a first radio access technology (RAT) and communicating on the one or more accessible set of frequencies using a second RAT different from the first RAT.

Some examples of the method, apparatuses, and non-transitory computer-readable medium described herein may further include operations, features, means, or instructions for receiving the signaling on a radio frequency spectrum band that may be outside of the shared radio frequency spectrum band.

In some examples of the method, apparatuses, and non-transitory computer-readable medium described herein, the signaling includes a recurring transmission on the radio frequency spectrum band that may be outside of the shared radio frequency spectrum band.

Some examples of the method, apparatuses, and non-transitory computer-readable medium described herein may further include operations, features, means, or instructions for receiving the signaling on a radio frequency spectrum band that may be within the shared radio frequency spectrum band.

In some examples of the method, apparatuses, and non-transitory computer-readable medium described herein, the signaling includes a recurring transmission on the radio frequency spectrum band that may be within the shared radio frequency spectrum band.

In some examples of the method, apparatuses, and non-transitory computer-readable medium described herein, the signaling includes a SIB, an SSB, a sidelink transmission, a periodic broadcast transmission, or a combination thereof.

In some examples of the method, apparatuses, and non-transitory computer-readable medium described herein, the second wireless device may have direct access to the access information.

In some examples of the method, apparatuses, and non-transitory computer-readable medium described herein, the second wireless device includes a gNodeB, a sidelink relay device, a roadside unit (RSU), a sidelink UE, or a sidelink scheduling device.

In some examples of the method, apparatuses, and non-transitory computer-readable medium described herein, the access information includes automated frequency control information.

In some examples of the method, apparatuses, and non-transitory computer-readable medium described herein, the shared radio frequency spectrum band includes a first band from 5.925 GHz to 6.425 GHz or a second band from 6.525 GHz to 6.875 GHz.

A method for wireless communication at a first wireless device is described. The method may include receiving access information that indicates an accessible set of frequencies of a set of multiple frequencies of a shared radio frequency spectrum band that are accessible for communications by a second wireless device and transmitting, to the second wireless device, signaling that indicates the access information.

An apparatus for wireless communication at a first wireless device is described. The apparatus may include a processor, memory coupled with the processor, and instructions stored in the memory. The instructions may be executable by the processor to cause the apparatus to receive access information that indicates an accessible set of frequencies of a set of multiple frequencies of a shared radio frequency spectrum band that are accessible for communications by a second wireless device and transmit, to the second wireless device, signaling that indicates the access information.

Another apparatus for wireless communication at a first wireless device is described. The apparatus may include means for receiving access information that indicates an accessible set of frequencies of a set of multiple frequencies of a shared radio frequency spectrum band that are accessible for communications by a second wireless device and means for transmitting, to the second wireless device, signaling that indicates the access information.

A non-transitory computer-readable medium storing code for wireless communication at a first wireless device is described. The code may include instructions executable by a processor to receive access information that indicates an accessible set of frequencies of a set of multiple frequencies of a shared radio frequency spectrum band that are accessible for communications by a second wireless device and transmit, to the second wireless device, signaling that indicates the access information.

In some examples of the method, apparatuses, and non-transitory computer-readable medium described herein, the signaling includes a message including the access information.

Some examples of the method, apparatuses, and non-transitory computer-readable medium described herein may further include operations, features, means, or instructions for receiving, from the second wireless device, a request message including a request for the access information, where transmitting the signaling may be based on the request message.

Some examples of the method, apparatuses, and non-transitory computer-readable medium described herein may further include operations, features, means, or instructions for transmitting the signaling on a radio frequency spectrum band that may be outside of the shared radio frequency spectrum band.

In some examples of the method, apparatuses, and non-transitory computer-readable medium described herein, the signaling includes a recurring transmission on the radio frequency spectrum band that may be outside of the shared radio frequency spectrum band.

Some examples of the method, apparatuses, and non-transitory computer-readable medium described herein may further include operations, features, means, or instructions for transmitting the signaling on a radio frequency spectrum band that may be within the shared radio frequency spectrum band.

In some examples of the method, apparatuses, and non-transitory computer-readable medium described herein, the signaling includes a recurring transmission on the radio frequency spectrum band that may be within the shared radio frequency spectrum band.

In some examples of the method, apparatuses, and non-transitory computer-readable medium described herein, the signaling includes a SIB, an SSB, a sidelink transmission, a periodic broadcast transmission, or a combination thereof.

Some examples of the method, apparatuses, and non-transitory computer-readable medium described herein may further include operations, features, means, or instructions for receiving the access information using a first RAT and transmitting the signaling using a second RAT different from the first RAT.

Some examples of the method, apparatuses, and non-transitory computer-readable medium described herein may further include operations, features, means, or instructions for retrieving the access information from a local storage media of the first wireless device.

DETAILED DESCRIPTION

Figure 1:
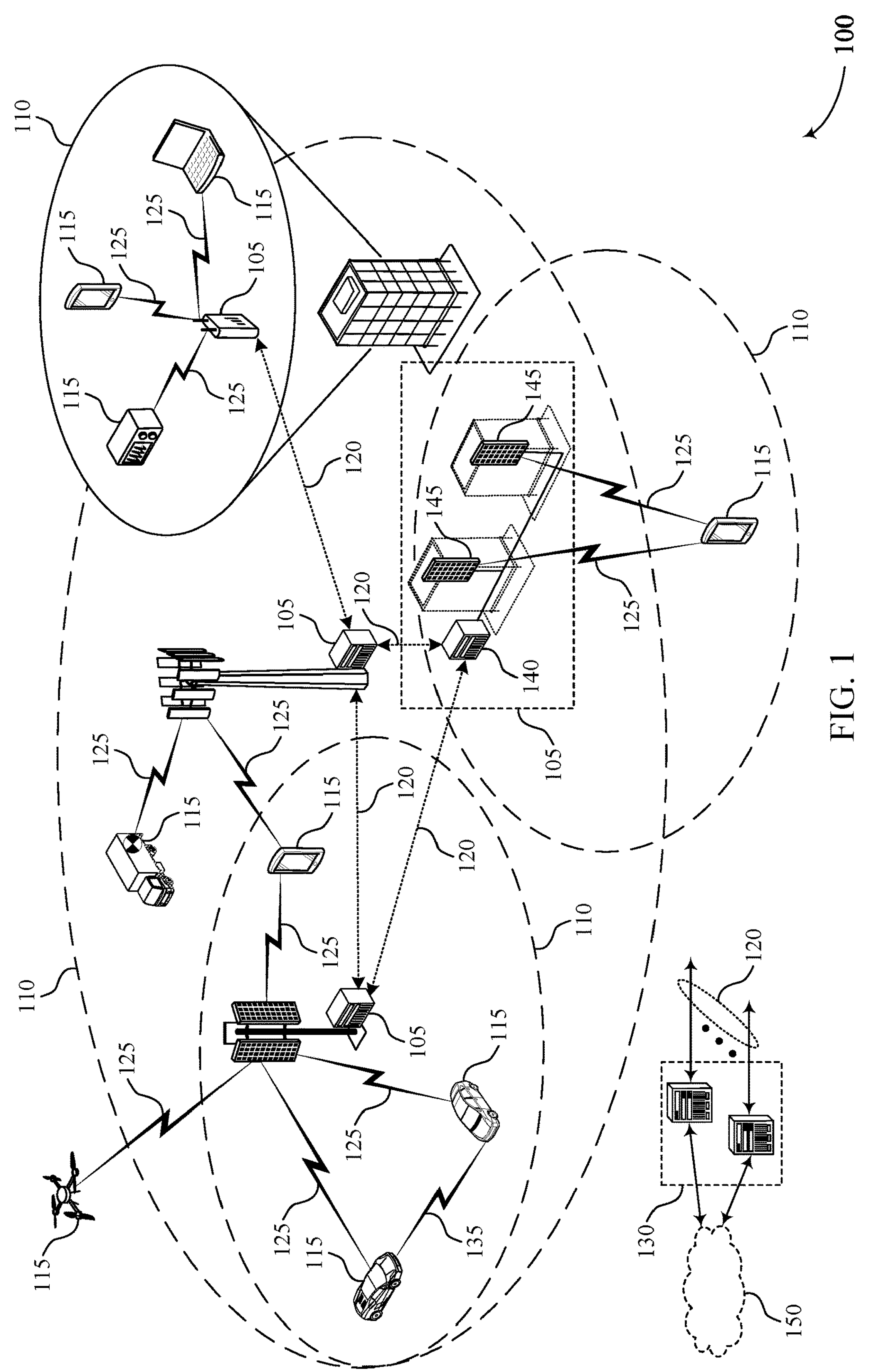
FIG. 1 illustrates an example of a wireless communications system that supports shared radio frequency band access indications in accordance with aspects of the present disclosure.

In some wireless communications systems, a sensing device (e.g., a UE, a vehicle UE (vUE), a sensor, a camera, etc.) may communicate via a shared (e.g., unlicensed) frequency spectrum band. A sensing device operating in a shared frequency spectrum may use access information (e.g., automated frequency control (AFC) information in an AFC system) to identify which frequencies the sensing device is allowed to access. For example, one or more frequencies of the shared frequency spectrum band may be occupied by or otherwise reserved for devices incumbent to the wireless communications system, and the sensing device may only be allowed access to frequencies that will not cause interference for the incumbent devices.

In some cases, however, the sensing device may not have direct access to the access information. For example, the sensing device may not be able to connect to an access point (e.g., a base station) providing service to the AFC system, e.g., the sensing device may use a first radio interface whereas the access point may use a second radio interface different from the first radio interface, and the sensing device may therefore be unable to obtain the access information from the access point. Additionally, or alternatively, there may be physical attributes corresponding to the sensing device restricting the sensing device from directly obtaining the access information. For instance, the sensing device may be a low-cost, low-power device, such as a sensor, or may have one or more constraints (e.g., spatial constraints, physical constraints, positioning or location constraints, etc.) that prevent the sensing device from obtaining access information. Such a sensing device may not have a direct connection to the AFC system and may not know whether accessing a particular unlicensed or shared frequency is allowed.

Accordingly, a sensing device may obtain access information from another device that has a direct connection to the AFC system, such as any device that provides scheduling information to the sensing device. A scheduling device may transmit, to the sensing device, access information indicating a set of one or more frequencies accessible to the sensing device. The scheduling device may be a sidelink relay, a sidelink UE (e.g., that schedules other sidelink UEs), a roadside unit (RSU), a gNodeB (gNB), etc.

In some examples, the scheduling device may obtain the access information directly from the access point (e.g., using the same radio interface as the access point) or may retrieve the access information from a local storage media. In some examples, the scheduling device may transmit the access information periodically, semi-persistently, or on-demand (e.g., upon request of the sensing device). In some examples, the scheduling device may transmit the access information to the sensing device using a frequency that is within the shared radio frequency band. For instance, a first frequency band may be an example of a U-NII-5 unlicensed frequency band. The scheduling device may transmit access information to the sensing device using at least an accessible subband of the U-NII-5 frequency band. Conversely, the scheduling device may transmit access information to the sensing device using a frequency that is outside the shared radio frequency band. For instance, the scheduling device may send access information to the sensing device via a licensed band, such as an intelligent transportation systems (ITS) band, indicating that the sensing device may access one or more frequencies of the shared radio frequency spectrum band. In some cases, the scheduling device may include the access information in a periodic broadcast transmission, a sidelink transmission, a synchronization signal block (SSB), a system information block (SIB), or any combination thereof. In some examples, the scheduling device may transmit the access information as an implicit indication. For example, the presence of a transmission on a specific frequency (or set of frequencies) may implicitly indicate that the specific frequency (or set of frequencies) may be accessed by the sensing device. Additionally, or alternatively, the scheduling device may transmit the access information as an explicit indication. For instance, the scheduling device may transmit an indication (e.g., a message) of a set of accessible frequencies of the shared frequency band to the sensing device.

Upon receiving the access information indication, the sensing device may begin communicating on one or more frequencies of the accessible set of frequencies. Successfully delivering access information to the sensing device may improve connection establishment and enhance system efficiency.

Aspects of the disclosure are initially described in the context of wireless communications systems. Aspects of the disclosure are further illustrated by and described with reference to process flows, apparatus diagrams, system diagrams, and flowcharts that relate to shared radio frequency band access indications.

FIG. 1 illustrates an example of a wireless communications system 100 that supports shared radio frequency band access indications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the wireless communication system 100 may include a shared (e.g., unlicensed) radio frequency band, and the wireless communications system 100 may use AFC to identify which frequencies may be accessed by unlicensed devices (e.g., unlicensed UEs 115). An unlicensed UE 115 (e.g., a sensing device) may obtain access information (e.g., AFC information) indicating which frequencies of the shared radio frequency band are accessible to the UE 115. The UE 115 may monitor one or more frequencies (subbands) of a shared radio frequency spectrum band, receive signaling indicating one or more accessible frequencies of the shared radio frequency spectrum band, and communicate on the one or more accessible frequencies. The UE 115 may receive the signaling indicating the accessible frequencies from a scheduling device, such as a second UE 115 or a base station 105. The scheduling device may obtain the access information from an access point, local storage media, or the like. The scheduling device may transmit signaling indicating the accessible frequencies. In some examples, the scheduling device may transmit the signaling based on receiving a request message from the UE 115, according to an autonomous determination, or the like.

Figure 2:
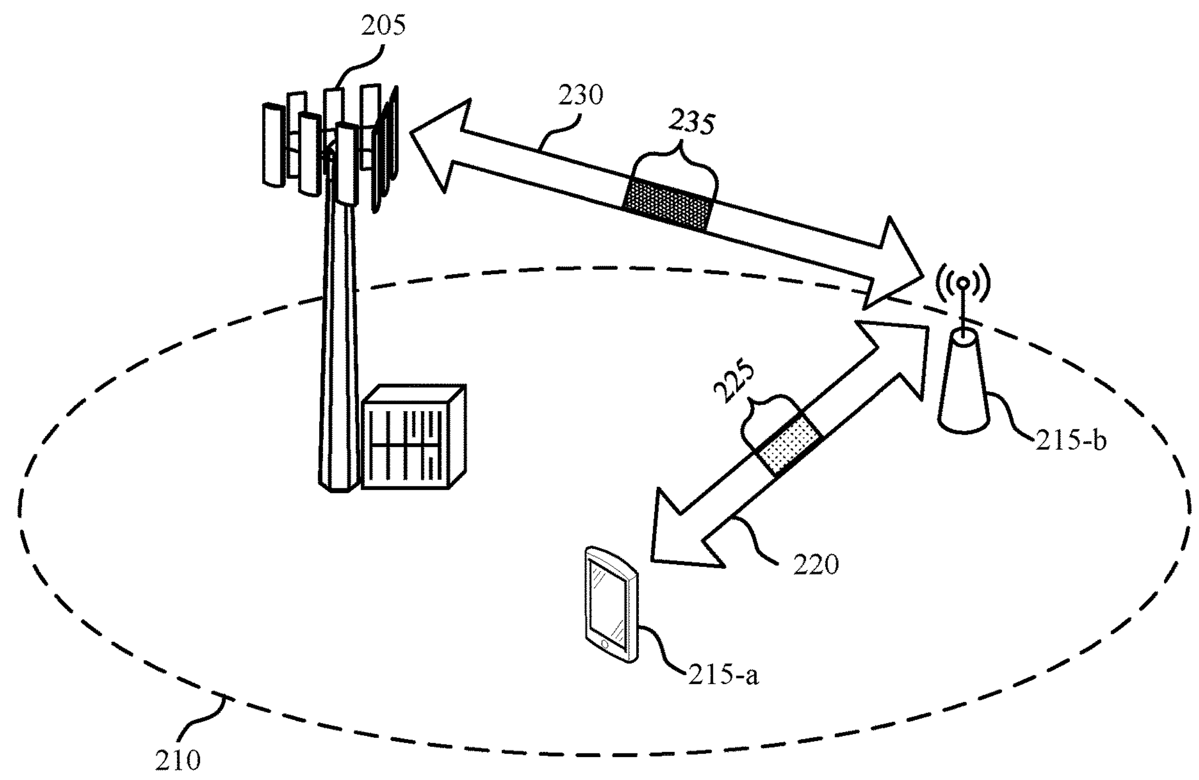
FIG. 2 illustrates an example of a wireless communications system that supports shared radio frequency band access indications in accordance with aspects of the present disclosure.

FIG. 2 illustrates an example of a wireless communications system 200 that supports shared radio frequency band access indications in accordance with aspects of the present disclosure. In some examples, the wireless communications system 200 may implement aspects of the wireless communications system 100 as described with reference to FIG. 1. The communications system 200 shows an example of communications between a sensing device 215-*a* and a scheduling device 215-*b* as well as communications between scheduling device 215-*b* and a base station 205. In some cases, sensing device 215-*a* and scheduling device 215-*b* may be examples of UEs 115 as described with reference to FIG. 1. Additionally, or alternatively, scheduling device 215-*b* may be an example of a device with signal relaying abilities (e.g., a sidelink relay, a sidelink UE (e.g., that schedules other sidelink UEs), a roadside unit (RSU), a gNodeB (gNB), etc.). In some cases, base station 205 may be an example of base station 105 as described with reference to FIG. 1.

The sensing device 215-*a*, the scheduling device 215-*b*, and the base station 205 may operate in a geographic area 210 and may communicate via communication links 220 and 230. In some examples, the sensing device 215-*a* may be an unlicensed device and may utilize a shared radio frequency spectrum band, such as an unlicensed frequency spectrum band with one or more subbands. For instance, the shared radio frequency spectrum band may be a 6 GHz band, where the 6 GHz band may be divided into one or more subbands. The subbands may be, for example, U-NII-5 (5.925 GHz to 6.425 GHz), U-NII-6 (6.425 GHz to 6.525 GHz), U-NII-7 (6.525 GHz to 6.875 GHz), U-NII-8 (6.875 GHz to 7.125 GHz), or the like. In some examples, the wireless communications system 200 may be an automated frequency control (AFC) system, such that one or more frequencies of the shared frequency spectrum band are reserved for certain devices (e.g., devices that are predefined to occupy those frequencies), and other devices in the system may be allowed to operate only on frequencies other than the reserved frequencies. As an example, and not by way of limitation, a network of televisions within an AFC system may operate at a reserved frequency (e.g., a frequency within U-NII-5, U-NII-7, or the like), and other devices in the AFC system may avoid operating at that frequency (e.g., to avoid introducing interference). In some examples, an AFC system may utilize access information (e.g., AFC information) that indicates which frequencies in the shared frequency spectrum band are accessible to particular devices, and which frequencies are reserved for other (e.g., incumbent) devices. In the example of FIG. 2, the base station 205 may indicate access information to devices in the wireless communications system 200, such as sensing device 215-*a*. The sensing device 215-*a* may monitor one or more frequencies of the shared frequency spectrum band and may receive the access information. The sensing device 215-*a* may utilize the access information to determine one or more frequencies of the shared frequency spectrum band on which the sensing device 215-*a* is allowed to operate. For example, the sensing device 215-*a* may avoid the reserved frequencies and instead communicate using one or more of the indicated accessible frequencies.

However, in some cases, the sensing device 215-*a* may not have direct access to the access information. For example, the sensing device 215-*a* may be configured to communicate using a first radio interface that is different from a second radio interface associated with the base station 205. For instance, the sensing device 215-*a* may be equipped with a radio access technology (RAT) corresponding to LTE communications whereas base station 205 may be equipped with a RAT corresponding to NR communications. Additionally, or alternatively, the sensing device 215-*a* may be subject to one or more constraints limiting the sensing device 215-*a* from directly communicating with base station 205. For example, the sensing device 215-*a* may be a low-power, low-cost device, such as a sensor, or may have one or more constraints (e.g., spatial constraints, physical constraints, positioning or location constraints) that prevent the sensing device 215-*a* from communicating with base station 205. In any case, the sensing device 215-*a* may not be able to communicate directly with the base station 205, and the sensing device 215-*a* may therefore be unaware of the accessible frequencies of the shared frequency spectrum band.

The techniques described herein provide for the wireless communications system 200 to support the sensing device 215-*a* receiving access information including an indication of a set of accessible frequencies of the shared frequency spectrum band. In the example of FIG. 2, the wireless communications system 200 may include the scheduling device 215-*b*, which may receive access information from the base station 205 and transmit the access information to the sensing device 215-*a*. The sensing device 215-*a* may therefore operate on the indicated accessible frequencies without having direct access to the access information.

In some cases, the scheduling device 215-*b* may obtain the access information directly from the base station 205 (e.g., by using a particular RAT such as NR, LTE, Wi-Fi, or via other methods of communication). For example, the base station 205 may transmit, via communication link 230, an access information message 235 to the scheduling device 215-*b* including the set of accessible frequencies. As an example, the sensing device 215-*a* may use a first RAT (e.g., LTE), the base station 205 may use a second RAT (e.g., NR), and the scheduling device 215-*b* may be capable of using either the first RAT or the second RAT. Accordingly, the scheduling device 215-*b* may act as a relay between the sensing device 215-*a* and the base station 205, and may receive the access information from the base station 205 for the sensing device 215-*a*. Additionally, or alternatively, the scheduling device 215-*b* may obtain the access information by retrieving the access information from local storage media. For example, the scheduling device 215-*b* may be equipped with a memory device that includes the access information. As such, the scheduling device 215-*b* may access the memory device and recall the access information.

Upon obtaining the access information, the scheduling device 215-*b* may transmit, via communication link 220, an access information indication 225 to the sensing device 215-*a*, including at least an indication of one or more accessible frequencies of the shared radio frequency spectrum band. The access information indication may be transmitted as a sidelink transmission, a system information block (SIB), a synchronization signal block (SSB), a periodic broadcast transmission, or some combination thereof. In some examples, the access information indication 225 may be an implicit indication. For instance, the scheduling device 215-*b* may transmit a message to the sensing device 215-*a* using a frequency indicated in the access information as an accessible frequency. The presence of the message on the frequency may indicate that the sensing device 215-*a* may communicate using the frequency with which the scheduling device 215-*b* transmitted the message. Phrased in a different way, the presence of any message on a particular frequency may imply that that frequency is an accessible frequency. In some other examples, the access information indication 225 may be an explicit indication. For instance, the scheduling device 215-*b* may transmit access information indication 225 as a message indicating one or more accessible frequencies of the shared radio frequency spectrum band. The sensing device 215-*a* may receive and decode the message to obtain the access information. As an example, the scheduling device 215-*b* may transmit a sidelink transmission to the sensing device 215-*a* where the sidelink transmission may include a list of one or more accessible frequencies.

In some cases, the scheduling device 215-*b* may transmit the access information indication 225 in a frequency band that is not within the shared frequency spectrum band. Additionally, in such cases, the scheduling device 215-*b* may transmit the access information indication 225 as a recurring transmission. The periodicity of the recurring transmission may be predefined by the scheduling device 215-*b*, signaled by the base station 205, or the like. For example, the scheduling device 215-*b* may include the access information indication 225 in a SIB message on a frequency band different from the shared frequency spectrum band. In another example, the scheduling device 215-*b* may transmit the access information indication 225 in a sidelink transmission on a sidelink band known to both the scheduling device 215-*b* and the sensing device 215-*a*. In some cases, the scheduling device 215-*b* may transmit the access information indication 225 as a recurring transmission within the shared frequency spectrum band. For instance, the scheduling device 215-*b* may transmit the access information indication 225 within a periodic broadcast transmission. Additionally, or alternatively, the scheduling device 215-*b* may transmit the access information indication 225 within an SSB. In some examples, the SSB message may be an example of a sidelink SSB message.

The scheduling device 215-*b* may transmit the access information indication 225 to the sensing device 215-*a* periodically or semi-persistently. In some examples, the scheduling device 215-*b* may transmit the access information indication 225 on demand, e.g., based on a request message transmitted by the sensing device 215-*a*. For instance, the sensing device 215-*a* may be an example of a vUE and the scheduling device 215-*b* may be an example of an RSU. In such an example, the scheduling device 215-*b* may have a Uu connection to the base station 205 and the sensing device 215-*a* may not. As such, the sensing device 215-*a* may transmit a request (e.g., via V2X communications) for the access information indication 225 to the scheduling device 215-*b*. In some cases, if the sensing device 215-*a* transmits a request for the access information indication 225, the sensing device 215-*a* may transmit the request to the scheduling device 215-*b* via a frequency band different from the shared frequency band (e.g., an intelligent transportation systems (ITS) band).

Upon receiving the access information indication 225, the sensing device 215-*a* may communicate on one or more of the indicated accessible frequencies based on the access information indication 225.

Signaling access information to a sensing device without the ability to directly access such information may result in less interference on reserved frequencies, improved communication establishment at the sensing device, and enhanced system efficiency. Specific signaling methods are provided in more detail with reference to FIG. 3.

Figure 3:
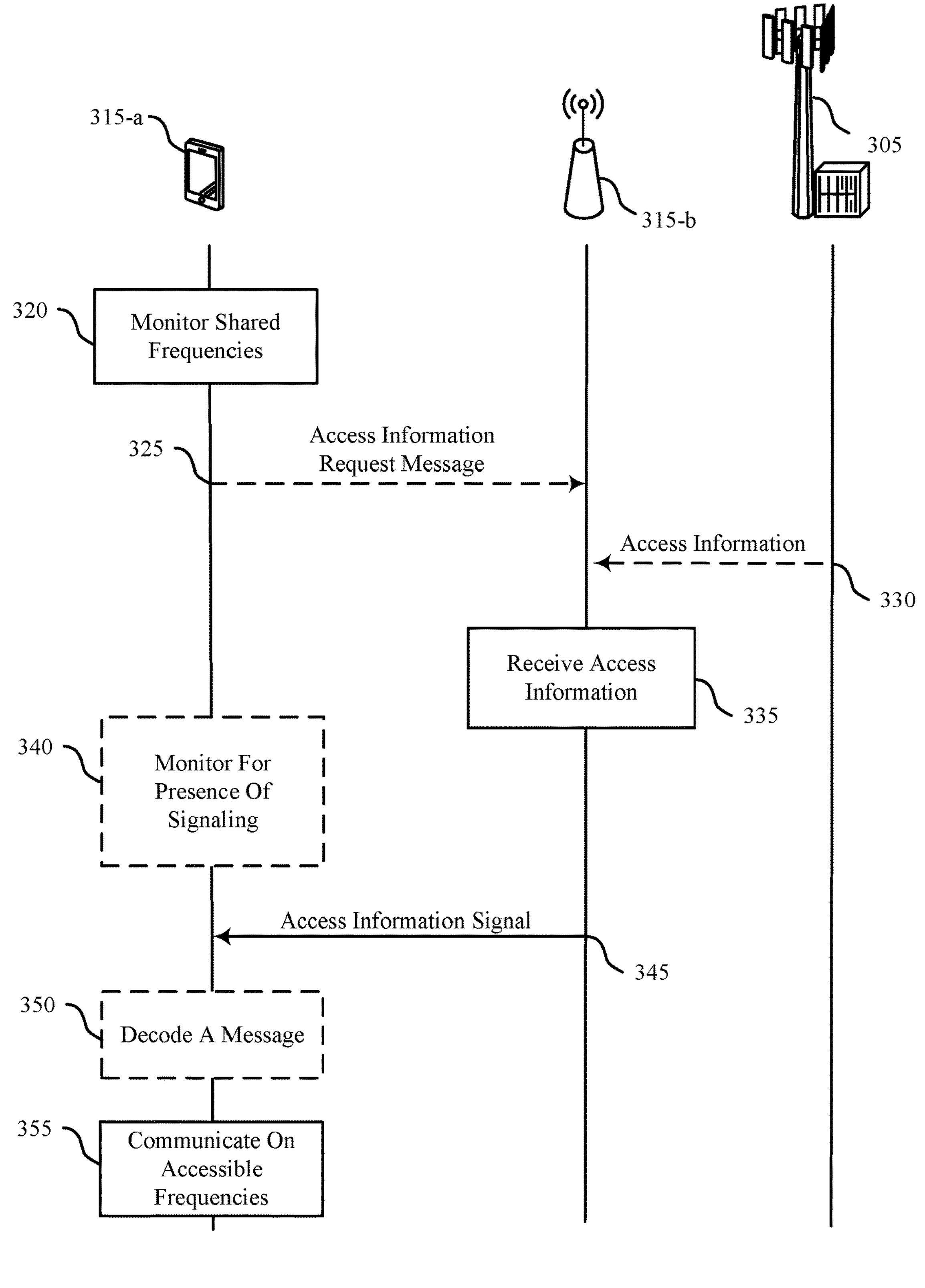
FIG. 3 illustrates an example of a process flow that supports shared radio frequency band access indications in accordance with aspects of the present disclosure.

FIG. 3 illustrates an example of a process flow 300 that supports shared radio frequency band access indications in accordance with aspects of the present disclosure. In some examples, the process flow 300 may implement aspects of the wireless communications systems 100 and 200 as described with reference to FIGS. 1 and 2, respectively. The process flow 300 shows an example of communications between a sensing device 315-*a* and a scheduling device 315-*b*, as well as communications between the scheduling device 315-*b* and a base station 305. In some cases, sensing device 315-*a* and scheduling device 315-*b* may be examples of UEs 115 as described with reference to FIG. 1. Additionally, or alternatively, scheduling device 315-*b* may be an example of a device with signal relaying abilities (e.g., a sidelink relay, a sidelink UE (e.g., that schedules other sidelink UEs), a roadside unit (RSU), a gNodeB (gNB), etc.). In some cases, base station 305 may be an example of base stations 105 or base station 205 as described with reference to FIGS. 1 and 2, respectively. Alternative examples of the following may be implemented, where some steps are performed in a different order than described or are not performed at all. In some cases, steps may include additional features not mentioned below, or further steps may be included.

At 320, the sensing device 315-*a* may monitor one or more frequencies (e.g., subbands) of a shared frequency spectrum band. The shared frequency spectrum band may be in an unlicensed spectrum, where a set of frequencies may be reserved for one or more devices. As an example, a network of speakers may operate with a first frequency band within the shared frequency spectrum band. As such, the first frequency band may be reserved for the network of speakers. Other devices operating on the shared frequency spectrum band within the wireless communications system may have access to AFC information indicating accessible frequencies of the shared frequency spectrum band. One such device may be scheduling device 315-*b*.

At 325, in some examples, the sensing device 315-*a* may transmit, to the scheduling device 315-*b*, an access information request message that includes a request for access information (e.g., AFC information) associated with the shared frequency spectrum band. The sensing device 315-*a* may transmit the access information request message to the scheduling device 315-*b* on a frequency that is not within the shared frequency spectrum. In some examples, the sensing device 315-*a* may transmit the access information request message using a first RAT. For example, the sensing device 315-*a* may communicate using LTE communications and the sensing device 315-*a* may transmit the access information request message using LTE.

At 330, the scheduling device 315-*b* may optionally receive, from the base station 305, access information (e.g., AFC information) for the sensing device 315-*a*. In some examples, the base station 305 may transmit, and the scheduling device 315-*b* may receive, the access information using a second RAT (e.g., different from the first RAT used by the sensing device 315-*a*). For example, the base station 305 may transmit the access information to the scheduling device 315-*b* using NR communications. Additionally, or alternatively, the base station 305 may transmit the access information to the scheduling device 315-*b* via a frequency band different than the shared frequency spectrum band, such as a licensed frequency band.

In some examples, the scheduling device 315-*b* may not receive access information from the base station 305.

Accordingly, at 335, the scheduling device 315-*b* may retrieve the access information from another source. For instance, the scheduling device 315-*b* may receive access information from a device other than the base station 305, a RAT other than the first or second RAT, Wi-fi, or local storage media of the scheduling device 315-*b*, among other examples. For instance, the scheduling device 315-*b* may be equipped with a memory device preloaded with access information including an accessible set of frequencies of the shared frequency spectrum. In some examples, the memory device may be an example of firmware such as a hard drive, a random access memory (RAM) stick, a solid state drive (SSD), or the like.

At 340, in some examples, the sensing device 315-*a* may monitor one or more frequencies of the shared frequency spectrum for the presence of a signal. If the sensing device 315-*a* receives signaling on the one or more monitored frequencies, the sensing device 315-*a* may determine that the one or more frequencies with which the sensing device 315-*a* received the signaling is an allowable frequency. That is, the presence of signaling on the frequency band may imply accessibility of the frequency band.

At 345, the scheduling device 315-*b* may transmit, and the sensing device 315-*a* may receive, access information signaling including at least an indication of one or more accessible frequencies of the shared frequency spectrum band. The access information signal may be an example of the access information indication 225 as described with reference to FIG. 2. In some cases, the scheduling device 315-*b* may transmit the access information signal based on receiving the access information at 330 or 335. Additionally, or alternatively, the scheduling device 315-*b* may transmit the access information signal based on receiving the access information request message at 325 (e.g., on-demand by the sensing device 315-*a*). In some cases, the scheduling device 315-*b* may transmit the access information signal on a frequency spectrum band that is outside of the shared frequency spectrum band. In some other cases, the scheduling device 315-*b* may transmit the access information signal on a frequency spectrum band within the shared frequency spectrum band.

The scheduling device 315-*b* may transmit the access information signal as a recurring transmission, such as a periodic broadcast transmission. As an example, the scheduling device 315-*b* may transmit a SIB including the access information signal. The periodicity of the periodic broadcast transmission may be autonomously determined at the scheduling device 315-*b*, signaled by the base station 305, or the like. In another example, the scheduling device 315-*b* may transmit the access information signal as a sidelink transmission on a sidelink band known to both the scheduling device 315-*b* and the sensing device 315-*a*. For example, the sensing device 315-*a* may be a vUE and the scheduling device 315-*b* may be an RSU, and the RSU may transmit the access information signal to the vUE via a sidelink transmission on a sidelink band. In some cases, the scheduling device 315-*b* may transmit the access information signal in an SSB message. For instance, if the sensing device 315-*a* requests timing synchronization information from the scheduling device 315-*b* for subsequent communications, the scheduling device 315-*b* may transmit an SSB message including the access information signal to the sensing device 315-*a* based on the request. In some cases, the scheduling device 315-*b* may transmit the SSB message over a sidelink connection. In some cases, the scheduling device 315-*b* may transmit the access information signal using a RAT different from the RAT with which the scheduling device 315-*b* received the access information at 330. For instance, if the base station 305 directly transmits the access information to the scheduling device 315-*b* at 325, the scheduling device 315-*b* may use a first RAT (e.g., NR) to receive the access information. The scheduling device 315-*b* may then use a second RAT (e.g., LTE) to transmit the access information signal to the sensing device 315-*a* at 345. The access information signal may be an explicit message indicating the access information.

At 350, upon receiving the access information signal at 345, if the access information signal includes an explicit message indicating the access information, the sensing device 315-*a* may decode the message (e.g., to read a payload of the message). Decoding the message may allow the sensing device 315-*a* to determine the one or more accessible frequencies of the shared radio frequency spectrum.

At 355, the sensing device 315-*a* may begin communicating on one or more of the accessible frequencies of the shared radio frequency spectrum based on the access information. In some cases, the sensing device 315-*a* may begin communicating on the one or more accessible frequencies based on the implicit indication of the accessible frequencies as described at 340. Otherwise, the sensing device 315-*a* may begin communicating on the one or more accessible frequencies based on decoding the message at 350.

Figure 4:
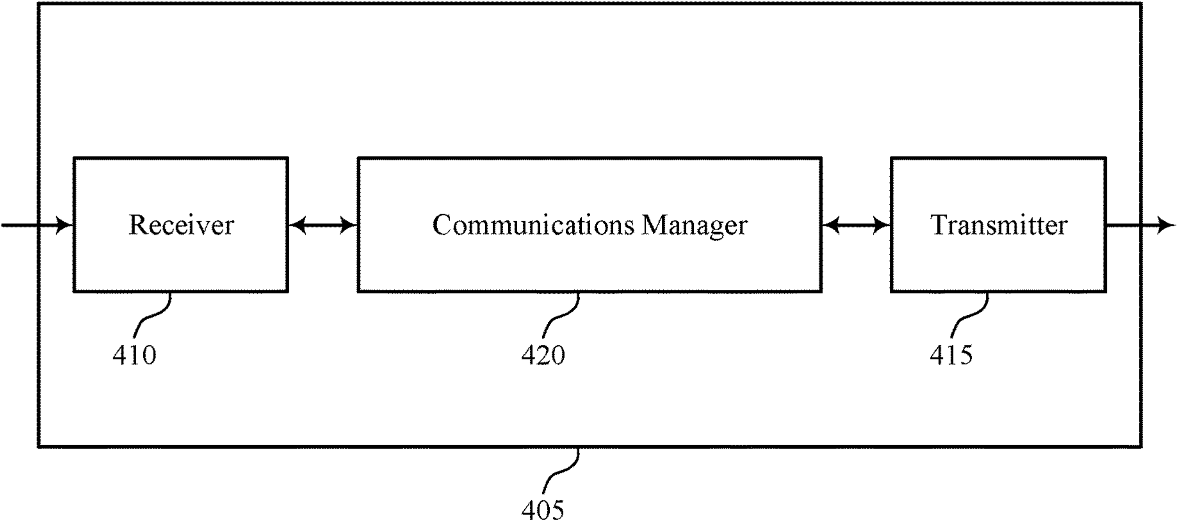
FIGS. 4 and 5 show block diagrams of devices that support shared radio frequency band access indications in accordance with aspects of the present disclosure.

FIG. 4 shows a block diagram 400 of a device 405 that supports shared radio frequency band access indications in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to shared radio frequency band access indications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to shared radio frequency band access indications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of shared radio frequency band access indications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first wireless device in accordance with examples as disclosed herein. For example, the communications manager 420 may be configured as or otherwise support a means for monitoring a set of multiple frequencies of a shared radio frequency spectrum band. The communications manager 420 may be configured as or otherwise support a means for receiving, from a second wireless device, signaling that indicates access information that indicates an accessible set of frequencies of the set of multiple frequencies of the shared radio frequency spectrum band that are accessible for communications by the first wireless device. The communications manager 420 may be configured as or otherwise support a means for communicating on one or more of the accessible set of frequencies of the shared radio frequency spectrum band based on the access information.

Additionally or alternatively, the communications manager 420 may support wireless communication at a first wireless device in accordance with examples as disclosed herein. For example, the communications manager 420 may be configured as or otherwise support a means for receiving access information that indicates an accessible set of frequencies of a set of multiple frequencies of a shared radio frequency spectrum band that are accessible for communications by a second wireless device. The communications manager 420 may be configured as or otherwise support a means for transmitting, to the second wireless device, signaling that indicates the access information.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for receiving access information in unlicensed radio frequency spectrum bands, which may result in enhanced connection establishment and more reliable communications. For example, a device 405 that is otherwise incapable of obtaining access information may receive access information from another device, and may determine allowable operating frequencies. The device 405 operating according to the access information may therefore communicate with increased reliability, by avoiding frequencies that may be reserved for incumbent devices or that may introduce interference.

Figure 5:
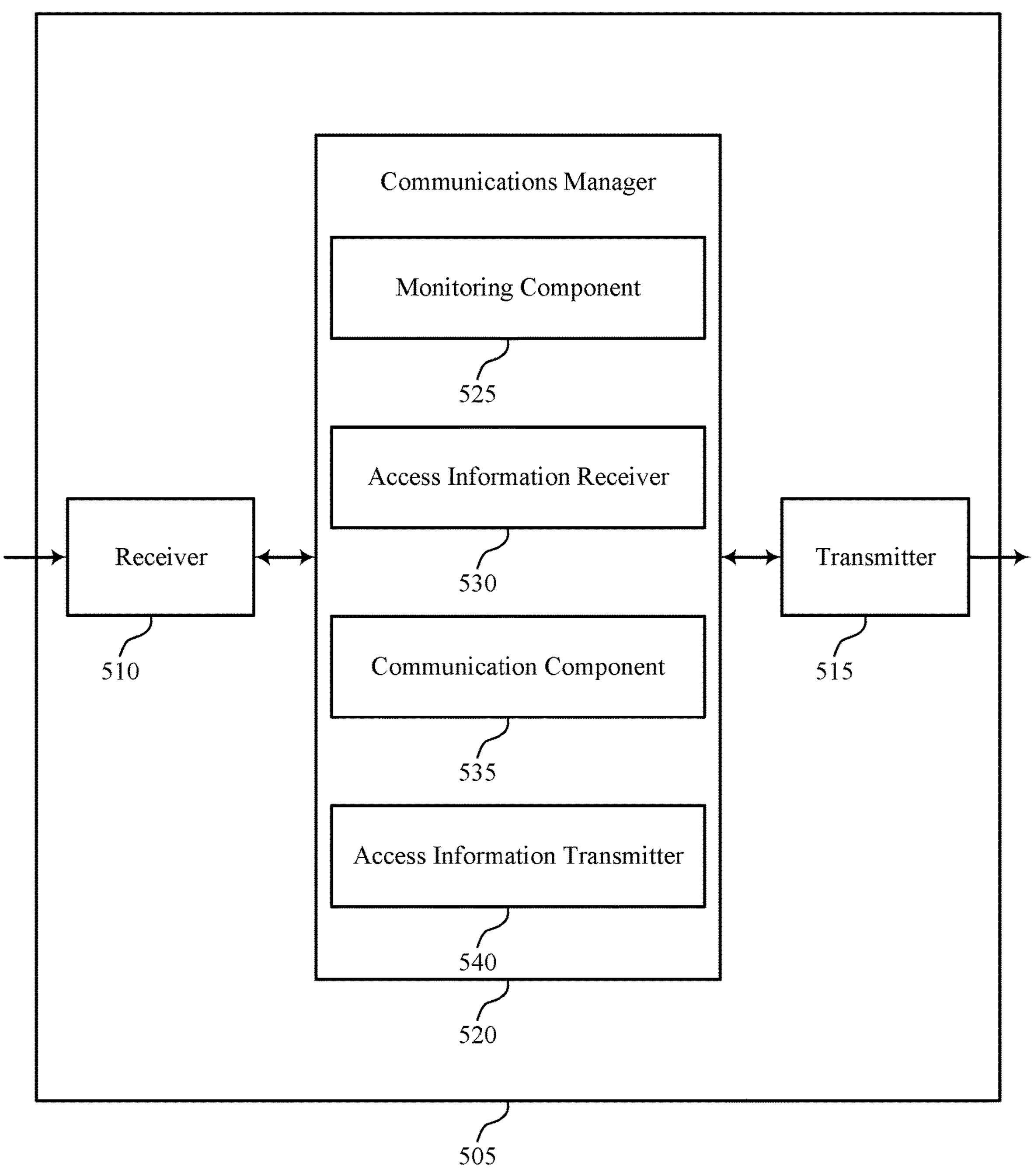

FIG. 5 shows a block diagram 500 of a device 505 that supports shared radio frequency band access indications in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to shared radio frequency band access indications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to shared radio frequency band access indications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of shared radio frequency band access indications as described herein. For example, the communications manager 520 may include a monitoring component 525, an access information receiver 530, a communication component 535, an access information transmitter 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. The monitoring component 525 may be configured as or otherwise support a means for monitoring a set of multiple frequencies of a shared radio frequency spectrum band. The access information receiver 530 may be configured as or otherwise support a means for receiving, from a second wireless device, signaling that indicates access information that indicates an accessible set of frequencies of the set of multiple frequencies of the shared radio frequency spectrum band that are accessible for communications by the first wireless device. The communication component 535 may be configured as or otherwise support a means for communicating on one or more of the accessible set of frequencies of the shared radio frequency spectrum band based on the access information.

Additionally or alternatively, the communications manager 520 may support wireless communication at a first wireless device in accordance with examples as disclosed herein. The access information receiver 530 may be configured as or otherwise support a means for receiving access information that indicates an accessible set of frequencies of a set of multiple frequencies of a shared radio frequency spectrum band that are accessible for communications by a second wireless device. The access information transmitter 540 may be configured as or otherwise support a means for transmitting, to the second wireless device, signaling that indicates the access information.

Figure 6:
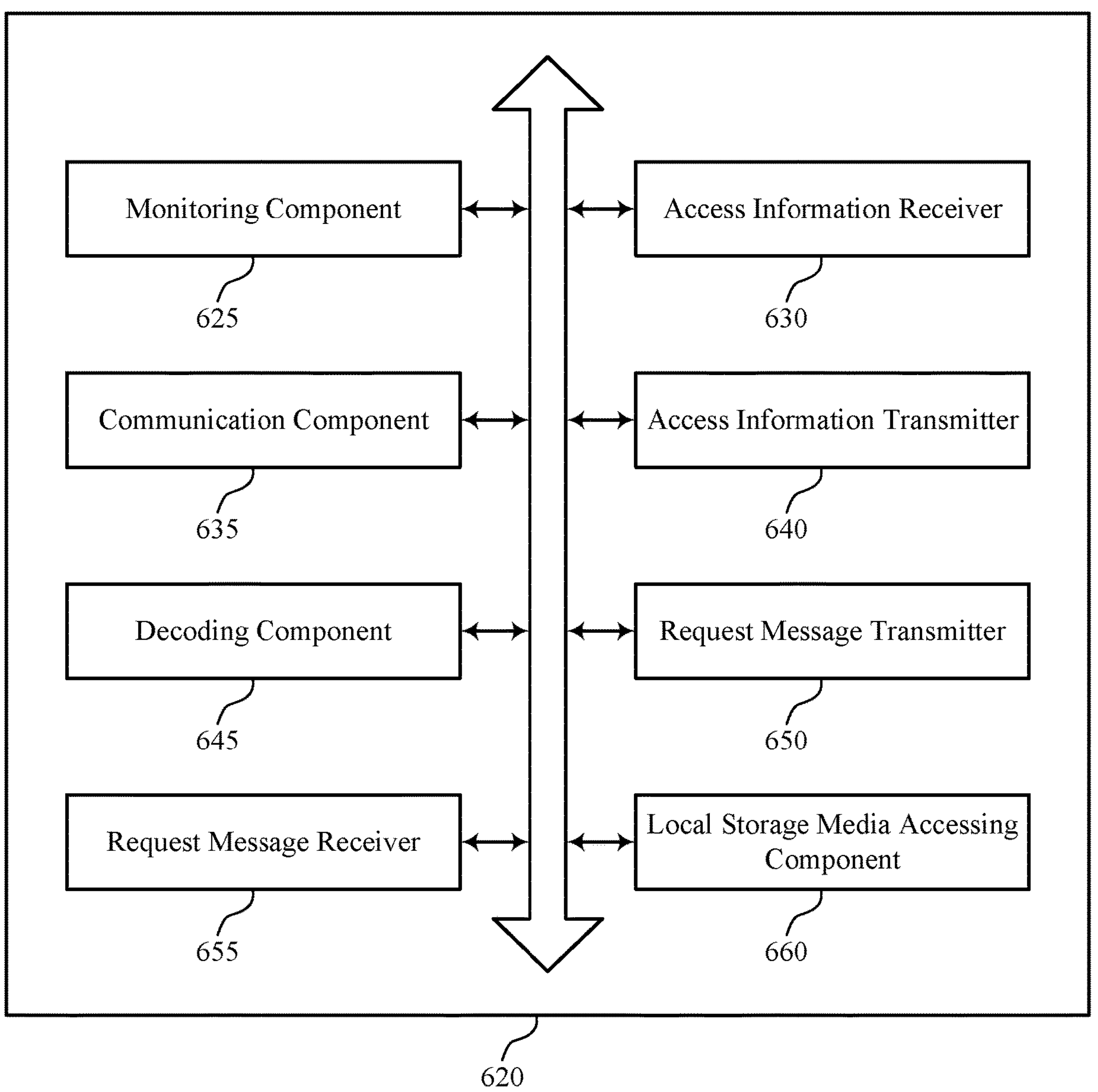
FIG. 6 shows a block diagram of a communications manager that supports shared radio frequency band access indications in accordance with aspects of the present disclosure.

FIG. 6 shows a block diagram 600 of a communications manager 620 that supports shared radio frequency band access indications in accordance with aspects of the present disclosure. The communications manager 620 may be an example of aspects of a communications manager 420, a communications manager 520, or both, as described herein. The communications manager 620, or various components thereof, may be an example of means for performing various aspects of shared radio frequency band access indications as described herein. For example, the communications manager 620 may include a monitoring component 625, an access information receiver 630, a communication component 635, an access information transmitter 640, a decoding component 645, a request message transmitter 650, a request message receiver 655, a local storage media accessing component 660, or any combination thereof. Each of these components may communicate, directly or indirectly, with one another (e.g., via one or more buses).

The communications manager 620 may support wireless communication at a first wireless device in accordance with examples as disclosed herein. The monitoring component 625 may be configured as or otherwise support a means for monitoring a set of multiple frequencies of a shared radio frequency spectrum band. The access information receiver 630 may be configured as or otherwise support a means for receiving, from a second wireless device, signaling that indicates access information that indicates an accessible set of frequencies of the set of multiple frequencies of the shared radio frequency spectrum band that are accessible for communications by the first wireless device. The communication component 635 may be configured as or otherwise support a means for communicating on one or more of the accessible set of frequencies of the shared radio frequency spectrum band based on the access information.

In some examples, the monitoring component 625 may be configured as or otherwise support a means for monitoring for a presence of the signaling on a first frequency of the set of multiple frequencies, where the presence of the signaling on the first frequency implicitly indicates to the first wireless device that the first frequency is included in the accessible set of frequencies.

In some examples, the decoding component 645 may be configured as or otherwise support a means for decoding a message based on the received signaling, where the message includes the access information.

In some examples, the request message transmitter 650 may be configured as or otherwise support a means for transmitting a request message including a request for the access information, where receiving the signaling is based on the request message.

In some examples, the access information receiver 630 may be configured as or otherwise support a means for receiving the signaling using a first RAT. In some examples, the communication component 635 may be configured as or otherwise support a means for communicating on the one or more accessible set of frequencies using a second RAT different from the first RAT.

In some examples, the access information receiver 630 may be configured as or otherwise support a means for receiving the signaling on a radio frequency spectrum band that is outside of the shared radio frequency spectrum band. In some examples, the signaling includes a recurring transmission on the radio frequency spectrum band that is outside of the shared radio frequency spectrum band.

In some examples, the access information receiver 630 may be configured as or otherwise support a means for receiving the signaling on a radio frequency spectrum band that is within the shared radio frequency spectrum band. In some examples, the signaling includes a recurring transmission on the radio frequency spectrum band that is within the shared radio frequency spectrum band. In some examples, the signaling includes an SIB, an SSB, a sidelink transmission, a periodic broadcast transmission, or a combination thereof.

In some examples, the second wireless device has direct access to the access information. In some examples, the second wireless device includes a gNodeB, a sidelink relay device, an RSU, a sidelink UE, or a sidelink scheduling device.

In some examples, the access information includes AFC information.

In some examples, the shared radio frequency spectrum band includes a first band from 5.925 GHz to 6.425 GHz or a second band from 6.525 GHz to 6.875 GHz.

Additionally or alternatively, the communications manager 620 may support wireless communication at a first wireless device in accordance with examples as disclosed herein. In some examples, the access information receiver 630 may be configured as or otherwise support a means for receiving access information that indicates an accessible set of frequencies of a set of multiple frequencies of a shared radio frequency spectrum band that are accessible for communications by a second wireless device. The access information transmitter 640 may be configured as or otherwise support a means for transmitting, to the second wireless device, signaling that indicates the access information. In some examples, the signaling includes a message including the access information.

In some examples, the request message receiver 655 may be configured as or otherwise support a means for receiving, from the second wireless device, a request message including a request for the access information, where transmitting the signaling is based on the request message.

In some examples, the access information transmitter 640 may be configured as or otherwise support a means for transmitting the signaling on a radio frequency spectrum band that is outside of the shared radio frequency spectrum band. In some examples, the signaling includes a recurring transmission on the radio frequency spectrum band that is outside of the shared radio frequency spectrum band.

In some examples, the access information transmitter 640 may be configured as or otherwise support a means for transmitting the signaling on a radio frequency spectrum band that is within the shared radio frequency spectrum band. In some examples, the signaling includes a recurring transmission on the radio frequency spectrum band that is within the shared radio frequency spectrum band. In some examples, the signaling includes an SIB, an SSB, a sidelink transmission, a periodic broadcast transmission, or a combination thereof.

In some examples, the access information receiver 630 may be configured as or otherwise support a means for receiving the access information using a first RAT. In some examples, the access information transmitter 640 may be configured as or otherwise support a means for transmitting the signaling using a second RAT different from the first RAT.

In some examples, the local storage media accessing component 660 may be configured as or otherwise support a means for retrieving the access information from a local storage media of the first wireless device.

In some examples, the signaling includes an SIB, an SSB, a sidelink transmission, a periodic broadcast transmission, or a combination thereof.

In some examples, the first wireless device has direct access to the access information.

In some examples, the first wireless device includes a gNodeB, a sidelink relay device, an RSU, a sidelink UE, or a sidelink scheduling device.

In some examples, the access information includes AFC information.

In some examples, the shared radio frequency spectrum band includes a first band from 5.925 GHz to 6.425 GHz or a second band from 6.525 GHz to 6.875 GHz.

Figure 7:
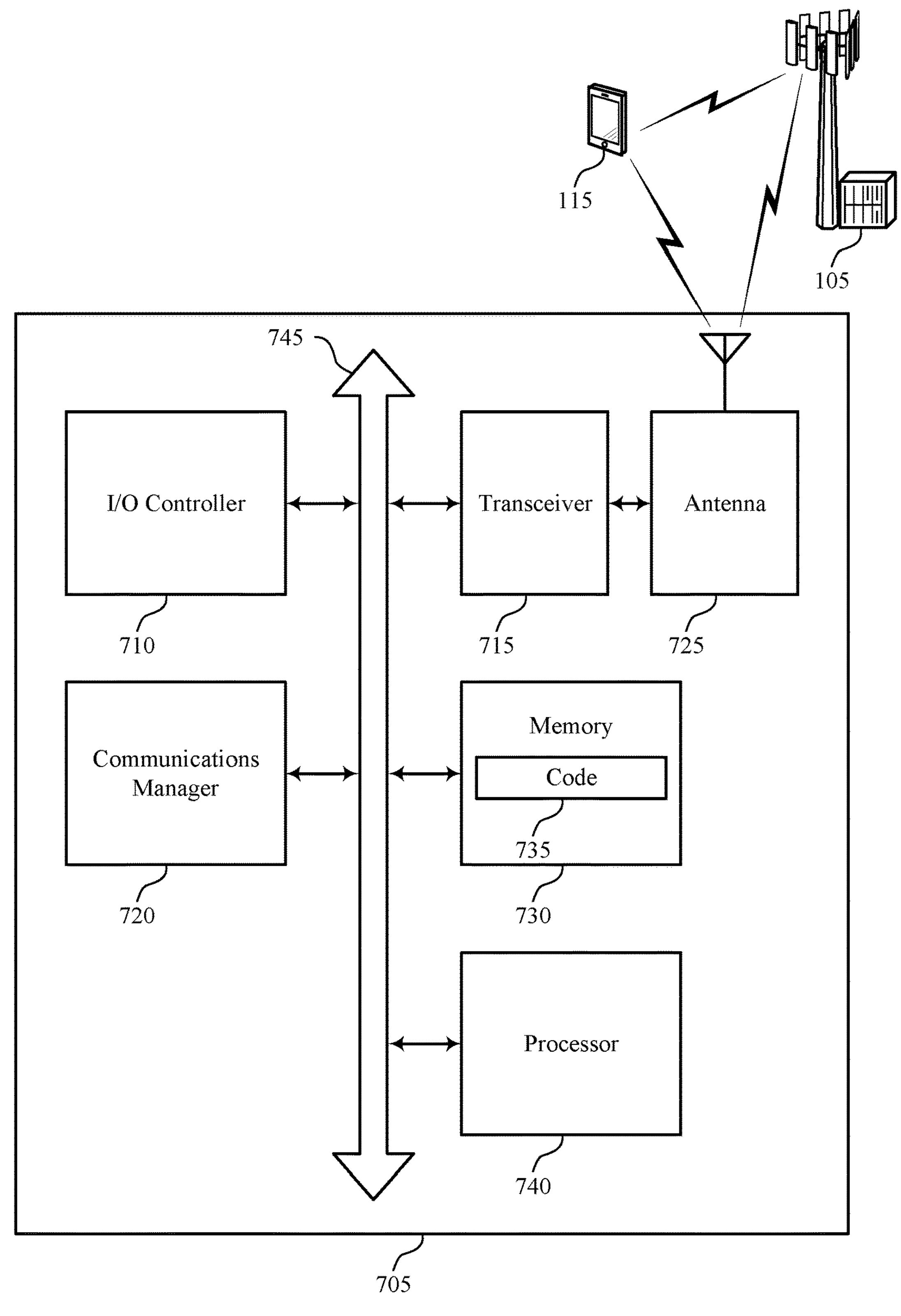
FIG. 7 shows a diagram of a system including a device that supports shared radio frequency band access indications in accordance with aspects of the present disclosure.

FIG. 7 shows a diagram of a system 700 including a device 705 that supports shared radio frequency band access indications in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting shared radio frequency band access indications). For example, the device 705 or a component of the device 705 may include a processor 740 and memory 730 coupled to the processor 740, the processor 740 and memory 730 configured to perform various functions described herein.

The communications manager 720 may support wireless communication at a first wireless device in accordance with examples as disclosed herein. For example, the communications manager 720 may be configured as or otherwise support a means for monitoring a set of multiple frequencies of a shared radio frequency spectrum band. The communications manager 720 may be configured as or otherwise support a means for receiving, from a second wireless device, signaling that indicates access information that indicates an accessible set of frequencies of the set of multiple frequencies of the shared radio frequency spectrum band that are accessible for communications by the first wireless device. The communications manager 720 may be configured as or otherwise support a means for communicating on one or more of the accessible set of frequencies of the shared radio frequency spectrum band based on the access information.

Additionally or alternatively, the communications manager 720 may support wireless communication at a first wireless device in accordance with examples as disclosed herein. For example, the communications manager 720 may be configured as or otherwise support a means for receiving access information that indicates an accessible set of frequencies of a set of multiple frequencies of a shared radio frequency spectrum band that are accessible for communications by a second wireless device. The communications manager 720 may be configured as or otherwise support a means for transmitting, to the second wireless device, signaling that indicates the access information.

By including or configuring the communications manager 720 in accordance with examples as described herein, the device 705 may support techniques for receiving access information for unlicensed radio frequency spectrum bands, which may result in enhanced system efficiency and reduced system latency. For example, a device 705 that may otherwise be incapable of obtaining access information in an AFC system may receive access information from another device. The device 705 may therefore communicate on accessible frequencies and avoid reserved frequencies, which may reduce overall system latency and improve performance.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of shared radio frequency band access indications as described herein, or the processor 740 and the memory 730 may be otherwise configured to perform or support such operations.

Figure 8:
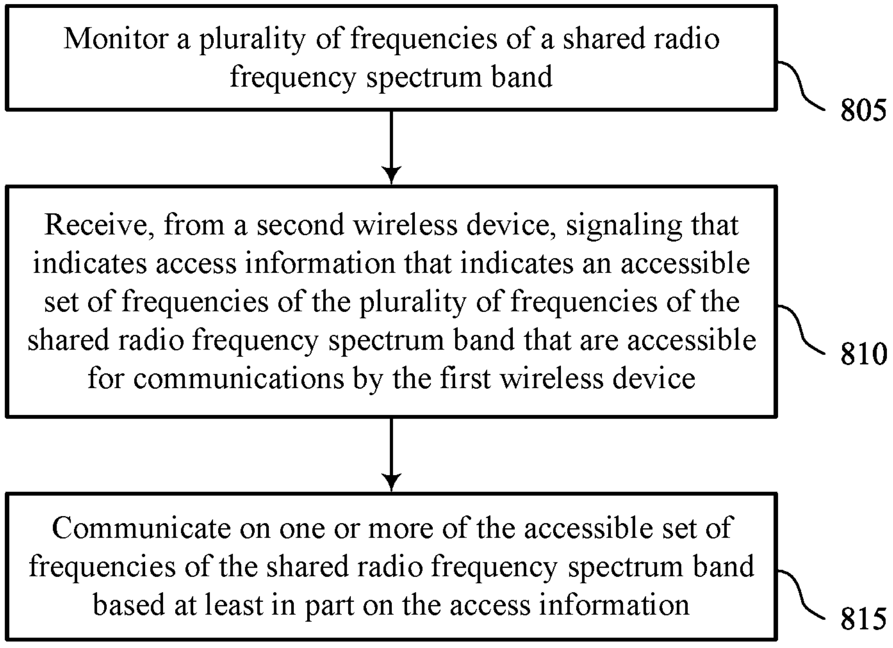
FIGS. 8 through 11 show flowcharts illustrating methods that support shared radio frequency band access indications in accordance with aspects of the present disclosure.

FIG. 8 shows a flowchart illustrating a method 800 that supports shared radio frequency band access indications in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include monitoring a set of multiple frequencies of a shared radio frequency spectrum band. The operations of 805 may be performed in accordance with examples as disclosed herein. In some examples, aspects of the operations of 805 may be performed by a monitoring component 625 as described with reference to FIG. 6.

At 810, the method may include receiving, from a second wireless device, signaling that indicates access information that indicates an accessible set of frequencies of the set of multiple frequencies of the shared radio frequency spectrum band that are accessible for communications by the first wireless device. The operations of 810 may be performed in accordance with examples as disclosed herein. In some examples, aspects of the operations of 810 may be performed by an access information receiver 630 as described with reference to FIG. 6.

At 815, the method may include communicating on one or more of the accessible set of frequencies of the shared radio frequency spectrum band based on the access information. The operations of 815 may be performed in accordance with examples as disclosed herein. In some examples, aspects of the operations of 815 may be performed by a communication component 635 as described with reference to FIG. 6.

Figure 9:
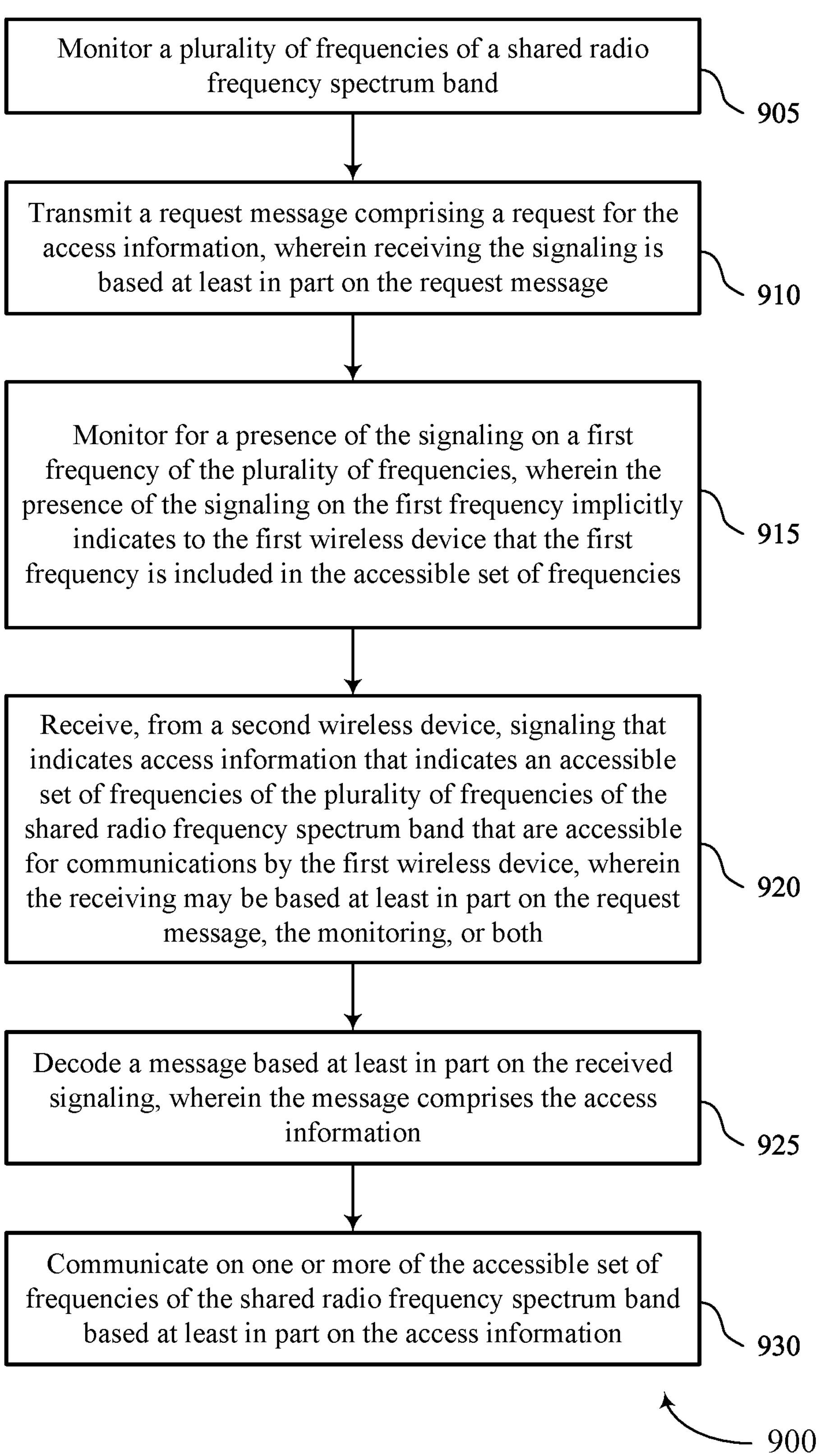

FIG. 9 shows a flowchart illustrating a method 900 that supports shared radio frequency band access indications in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include monitoring a set of multiple frequencies of a shared radio frequency spectrum band. The operations of 905 may be performed in accordance with examples as disclosed herein. In some examples, aspects of the operations of 905 may be performed by a monitoring component 625 as described with reference to FIG. 6.

At 910, the method may include transmitting a request message including a request for the access information, where receiving the signaling is based on the request message. The operations of 910 may be performed in accordance with examples as disclosed herein. In some examples, aspects of the operations of 910 may be performed by a request message transmitter 650 as described with reference to FIG. 6.

At 915, the method may include monitoring for a presence of the signaling on a first frequency of the set of multiple frequencies, where the presence of the signaling on the first frequency implicitly indicates to the first wireless device that the first frequency is included in the accessible set of frequencies. The operations of 915 may be performed in accordance with examples as disclosed herein. In some examples, aspects of the operations of 915 may be performed by a monitoring component 625 as described with reference to FIG. 6.

At 920, the method may include receiving, from a second wireless device, signaling that indicates access information that indicates an accessible set of frequencies of the set of multiple frequencies of the shared radio frequency spectrum band that are accessible for communications by the first wireless device. The receiving may be based on the monitoring, the request message, or both. The operations of 920 may be performed in accordance with examples as disclosed herein. In some examples, aspects of the operations of 920 may be performed by an access information receiver 630 as described with reference to FIG. 6.

At 925, the method may include decoding a message based on the received signaling, where the message includes the access information. The operations of 925 may be performed in accordance with examples as disclosed herein. In some examples, aspects of the operations of 925 may be performed by a decoding component 645 as described with reference to FIG. 6.

At 930, the method may include communicating on one or more of the accessible set of frequencies of the shared radio frequency spectrum band based on the access information. The operations of 930 may be performed in accordance with examples as disclosed herein. In some examples, aspects of the operations of 930 may be performed by a communication component 635 as described with reference to FIG. 6.

Figure 10:
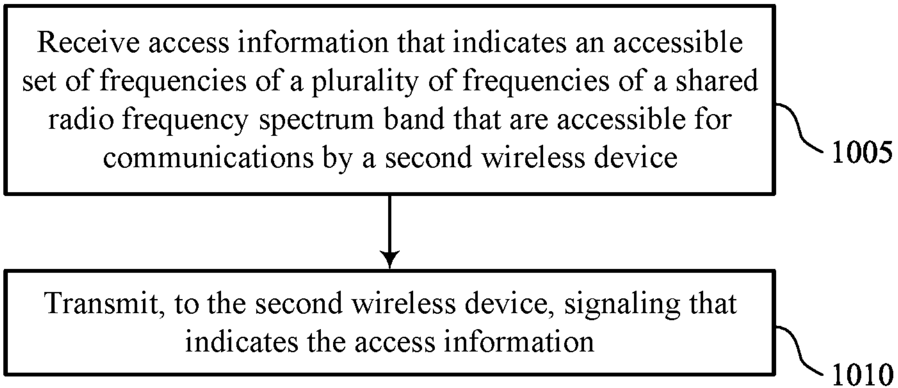

FIG. 10 shows a flowchart illustrating a method 1000 that supports shared radio frequency band access indications in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include receiving access information that indicates an accessible set of frequencies of a set of multiple frequencies of a shared radio frequency spectrum band that are accessible for communications by a second wireless device. The operations of 1005 may be performed in accordance with examples as disclosed herein. In some examples, aspects of the operations of 1005 may be performed by an access information receiver 630 as described with reference to FIG. 6.

At 1010, the method may include transmitting, to the second wireless device, signaling that indicates the access information. The operations of 1010 may be performed in accordance with examples as disclosed herein. In some examples, aspects of the operations of 1010 may be performed by an access information transmitter 640 as described with reference to FIG. 6.

Figure 11:
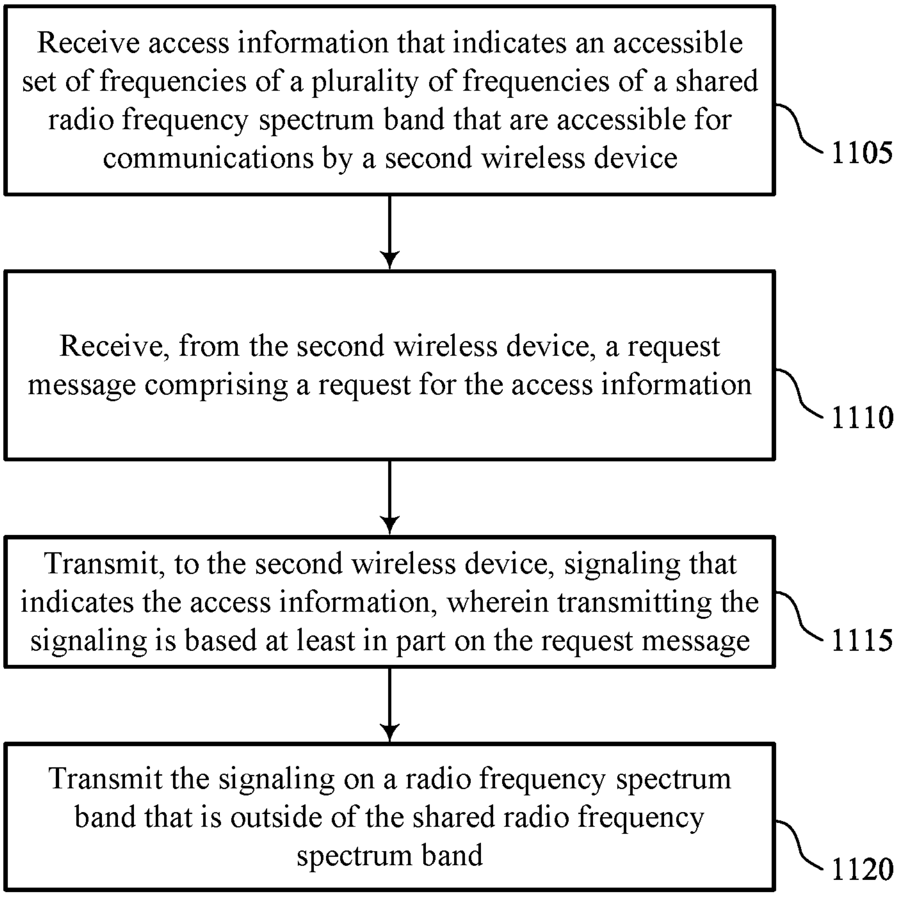

FIG. 11 shows a flowchart illustrating a method 1100 that supports shared radio frequency band access indications in accordance with aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1105, the method may include receiving access information that indicates an accessible set of frequencies of a set of multiple frequencies of a shared radio frequency spectrum band that are accessible for communications by a second wireless device. The operations of 1105 may be performed in accordance with examples as disclosed herein. In some examples, aspects of the operations of 1105 may be performed by an access information receiver 630 as described with reference to FIG. 6.

At 1110, the method may include receiving, from the second wireless device, a request message including a request for the access information, where transmitting the signaling is based on the request message. The operations of 1110 may be performed in accordance with examples as disclosed herein. In some examples, aspects of the operations of 1110 may be performed by a request message receiver 655 as described with reference to FIG. 6.

At 1115, the method may include transmitting, to the second wireless device, signaling that indicates the access information. The operations of 1115 may be performed in accordance with examples as disclosed herein. In some examples, aspects of the operations of 1115 may be performed by an access information transmitter 640 as described with reference to FIG. 6.

At 1120, the method may include transmitting the signaling on a radio frequency spectrum band that is outside of the shared radio frequency spectrum band. The operations of 1120 may be performed in accordance with examples as disclosed herein. In some examples, aspects of the operations of 1120 may be performed by an access information transmitter 640 as described with reference to FIG. 6.

The following provides an overview of aspects of the present disclosure:

Aspect 1: A method for wireless communication at a first wireless device, comprising: monitoring a plurality of frequencies of a shared radio frequency spectrum band; receiving, from a second wireless device, signaling that indicates access information that indicates an accessible set of frequencies of the plurality of frequencies of the shared radio frequency spectrum band that are accessible for communications by the first wireless device; and communicating on one or more of the accessible set of frequencies of the shared radio frequency spectrum band based at least in part on the access information.

Aspect 2: The method of aspect 1, further comprising: monitoring for a presence of the signaling on a first frequency of the plurality of frequencies, wherein the presence of the signaling on the first frequency implicitly indicates to the first wireless device that the first frequency is included in the accessible set of frequencies.

Aspect 3: The method of any of aspects 1 through 2, further comprising: decoding a message based at least in part on the received signaling, wherein the message comprises the access information.

Aspect 4: The method of any of aspects 1 through 3, further comprising: transmitting a request message comprising a request for the access information, wherein receiving the signaling is based at least in part on the request message.

Aspect 5: The method of any of aspects 1 through 4, further comprising: receiving the signaling using a first RAT; and communicating on the one or more accessible set of frequencies using a second RAT different from the first RAT.

Aspect 6: The method of any of aspects 1 through 5, further comprising: receiving the signaling on a radio frequency spectrum band that is outside of the shared radio frequency spectrum band.

Aspect 7: The method of aspect 6, wherein the signaling comprises a recurring transmission on the radio frequency spectrum band that is outside of the shared radio frequency spectrum band.

Aspect 8: The method of any of aspects 1 through 5, further comprising: receiving the signaling on a radio frequency spectrum band that is within the shared radio frequency spectrum band.

Aspect 9: The method of aspect 8, wherein the signaling comprises a recurring transmission on the radio frequency spectrum band that is within the shared radio frequency spectrum band.

Aspect 10: The method of any of aspects 1 through 9, wherein the signaling comprises an SIB, an SSB, a sidelink transmission, a periodic broadcast transmission, or a combination thereof.

Aspect 11: The method of any of aspects 1 through 10, wherein the second wireless device has direct access to the access information.

Aspect 12: The method of any of aspects 1 through 11, wherein the second wireless device comprises a gNodeB, a sidelink relay device, a roadside unit (RSU), a sidelink UE, or a sidelink scheduling device.

Aspect 13: The method of any of aspects 1 through 12, wherein the access information comprises automated frequency control information.

Aspect 14: The method of any of aspects 1 through 13, wherein the shared radio frequency spectrum band comprises a first band from 5.925 GHz to 6.425 GHz or a second band from 6.525 GHz to 6.875 GHz.

Aspect 15: A method for wireless communication at a first wireless device, comprising: receiving access information that indicates an accessible set of frequencies of a plurality of frequencies of a shared radio frequency spectrum band that are accessible for communications by a second wireless device; and transmitting, to the second wireless device, signaling that indicates the access information.

Aspect 16: The method of aspect 15, wherein the signaling comprises a message comprising the access information.

Aspect 17: The method of any of aspects 15 through 16, further comprising: receiving, from the second wireless device, a request message comprising a request for the access information, wherein transmitting the signaling is based at least in part on the request message.

Aspect 18: The method of any of aspects 15 through 17, further comprising: transmitting the signaling on a radio frequency spectrum band that is outside of the shared radio frequency spectrum band.

Aspect 19: The method of aspect 18, wherein the signaling comprises a recurring transmission on the radio frequency spectrum band that is outside of the shared radio frequency spectrum band.

Aspect 20: The method of any of aspects 15 through 17, further comprising: transmitting the signaling on a radio frequency spectrum band that is within the shared radio frequency spectrum band.

Aspect 21: The method of aspect 20, wherein the signaling comprises a recurring transmission on the radio frequency spectrum band that is within the shared radio frequency spectrum band.

Aspect 22: The method of any of aspects 15 through 21, wherein the signaling comprises an SIB, an SSB, a sidelink transmission, a periodic broadcast transmission, or a combination thereof.

Aspect 23: The method of any of aspects 15 through 22, further comprising: receiving the access information using a first RAT; and transmitting the signaling using a second RAT different from the first RAT.

Aspect 24: The method of any of aspects 15 through 23, further comprising: retrieving the access information from a local storage media of the first wireless device.

Aspect 25: The method of any of aspects 15 through 24, wherein the signaling comprises an SIB, an SSB, a sidelink transmission, a periodic broadcast transmission, or a combination thereof.

Aspect 26: An apparatus for wireless communication at a first wireless device, comprising a processor; memory coupled with the processor; and instructions stored in the memory and executable by the processor to cause the apparatus to perform a method of any of aspects 1 through 14.

Aspect 27: An apparatus for wireless communication at a first wireless device, comprising at least one means for performing a method of any of aspects 1 through 14.

Aspect 28: A non-transitory computer-readable medium storing code for wireless communication at a first wireless device, the code comprising instructions executable by a processor to perform a method of any of aspects 1 through 14.

Aspect 29: An apparatus for wireless communication at a first wireless device, comprising a processor; memory coupled with the processor; and instructions stored in the memory and executable by the processor to cause the apparatus to perform a method of any of aspects 15 through 25.

Aspect 30: An apparatus for wireless communication at a first wireless device, comprising at least one means for performing a method of any of aspects 15 through 25.

Aspect 31: A non-transitory computer-readable medium storing code for wireless communication at a first wireless device, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:

monitoring for a presence of signaling on a first frequency of a plurality of frequencies of a shared radio frequency spectrum band, wherein the presence of the signaling on the first frequency is indicative, to the first wireless device, that the first frequency is included in an accessible set of frequencies that are accessible for communications by the first wireless device;

receiving the signaling on the first frequency from a second wireless device based at least in part on an indication that the first frequency is included in the accessible set of frequencies, wherein the signaling indicates access information that indicates the accessible set of frequencies of the plurality of frequencies of the shared radio frequency spectrum; and communicating on one or more of the accessible set of frequencies of the shared radio frequency spectrum band based at least in part on the access information.

2. The method of claim 1, further comprising:

decoding a message based at least in part on the received signaling, wherein the message comprises the access information.

3. The method of claim 1, further comprising:

transmitting a request message comprising a request for the access information, wherein receiving the signaling is based at least in part on the request message.

4. The method of claim 1, further comprising:

receiving the signaling using a first radio access technology (RAT); and communicating on the one or more of the accessible set of frequencies using a second RAT different from the first RAT.

5. The method of claim 1, further comprising:

receiving the signaling on a radio frequency spectrum band that is outside of the shared radio frequency spectrum band.

6. The method of claim 5, wherein the signaling comprises a recurring transmission on the radio frequency spectrum band that is outside of the shared radio frequency spectrum band.

7. The method of claim 1, further comprising:

receiving the signaling on a radio frequency spectrum band that is within the shared radio frequency spectrum band.

8. The method of claim 7, wherein the signaling comprises a recurring transmission on the radio frequency spectrum band that is within the shared radio frequency spectrum band.

9. The method of claim 1, wherein the signaling comprises a system information block (SIB), a synchronization signal block (SSB), a sidelink transmission, a periodic broadcast transmission, or a combination thereof.

10. The method of claim 1, wherein the second wireless device has direct access to the access information.

11. The method of claim 1, wherein the second wireless device comprises a gNodeB, a sidelink relay device, a roadside unit (RSU), a sidelink UE, or a sidelink scheduling device.

12. The method of claim 1, wherein the access information comprises automated frequency control information.

13. The method of claim 1, wherein the shared radio frequency spectrum band comprises a first band from 5.925 GHz to 6.425 GHz or a second band from 6.525 GHz to 6.875 GHz.

14. A method for wireless communication at a first wireless device, comprising:

receiving access information that indicates an accessible set of frequencies of a plurality of frequencies of a shared radio frequency spectrum band that are accessible for communications by a second wireless device;

receiving, from the second wireless device, a request message comprising a request for the access information; and transmitting, to the second wireless device and based at least in part on the request message, signaling that indicates the access information.

15. The method of claim 14, wherein the signaling comprises a message comprising the access information.

16. The method of claim 14, further comprising:

transmitting the signaling on a radio frequency spectrum band that is outside of the shared radio frequency spectrum band.

17. The method of claim 16, wherein the signaling comprises a recurring transmission on the radio frequency spectrum band that is outside of the shared radio frequency spectrum band.

18. The method of claim 14, further comprising:

transmitting the signaling on a radio frequency spectrum band that is within the shared radio frequency spectrum band.

19. The method of claim 18, wherein the signaling comprises a recurring transmission on the radio frequency spectrum band that is within the shared radio frequency spectrum band.

20. The method of claim 14, wherein the signaling comprises a system information block (SIB), a synchronization signal block (SSB), a sidelink transmission, a periodic broadcast transmission, or a combination thereof.

21. The method of claim 14, further comprising:

receiving the access information using a first radio access technology (RAT); and transmitting the signaling using a second RAT different from the first RAT.

22. The method of claim 14, further comprising:

retrieving the access information from a local storage media of the first wireless device.

23. An apparatus for wireless communication at a first wireless device, comprising:

one or more processors;

one or more memories coupled with the one or more processors; and instructions stored in the one or more memories and executable by the one or more processors to cause the apparatus to:

monitor for a presence of signaling on a first frequency of a plurality of frequencies of a shared radio frequency spectrum band, wherein the presence of the signaling on the first frequency is indicative, to the first wireless device, that the first frequency is included in an accessible set of frequencies that are accessible for communications by the first wireless device;

receive the signaling on the first frequency from a second wireless device based at least in part on an indication that the first frequency is included in the accessible set of frequencies, wherein the signaling indicates access information that indicates the accessible set of frequencies of the plurality of frequencies of the shared radio frequency spectrum band; and communicate on one or more of the accessible set of frequencies of the shared radio frequency spectrum band based at least in part on the access information.

24. The apparatus of claim 23, wherein the instructions are further executable by the one or more processors to cause the apparatus to:

decode a message based at least in part on the received signaling, wherein the message comprises the access information.

25. The apparatus of claim 23, wherein the instructions are further executable by the one or more processors to cause the apparatus to:

transmit a request message comprising a request for the access information, wherein receiving the signaling is based at least in part on the request message.

26. An apparatus for wireless communication at a first wireless device, comprising:

one or more processors;

one or more memories coupled with the one or more processors; and instructions stored in the one or more memories and executable by the one or more processors to cause the apparatus to:

receive access information that indicates an accessible set of frequencies of a plurality of frequencies of a shared radio frequency spectrum band that are accessible for communications by a second wireless device;

receive, from the second wireless device, a request message comprising a request for the access information; and transmit, to the second wireless device and based at least in part on the request message, signaling that indicates the access information.

* * * * *